May 20, 1958
R. G. QUICK
2,835,135
MOTION TRANSMITTING DEVICES
Filed June 6, 1956
3 Sheets-Sheet 1
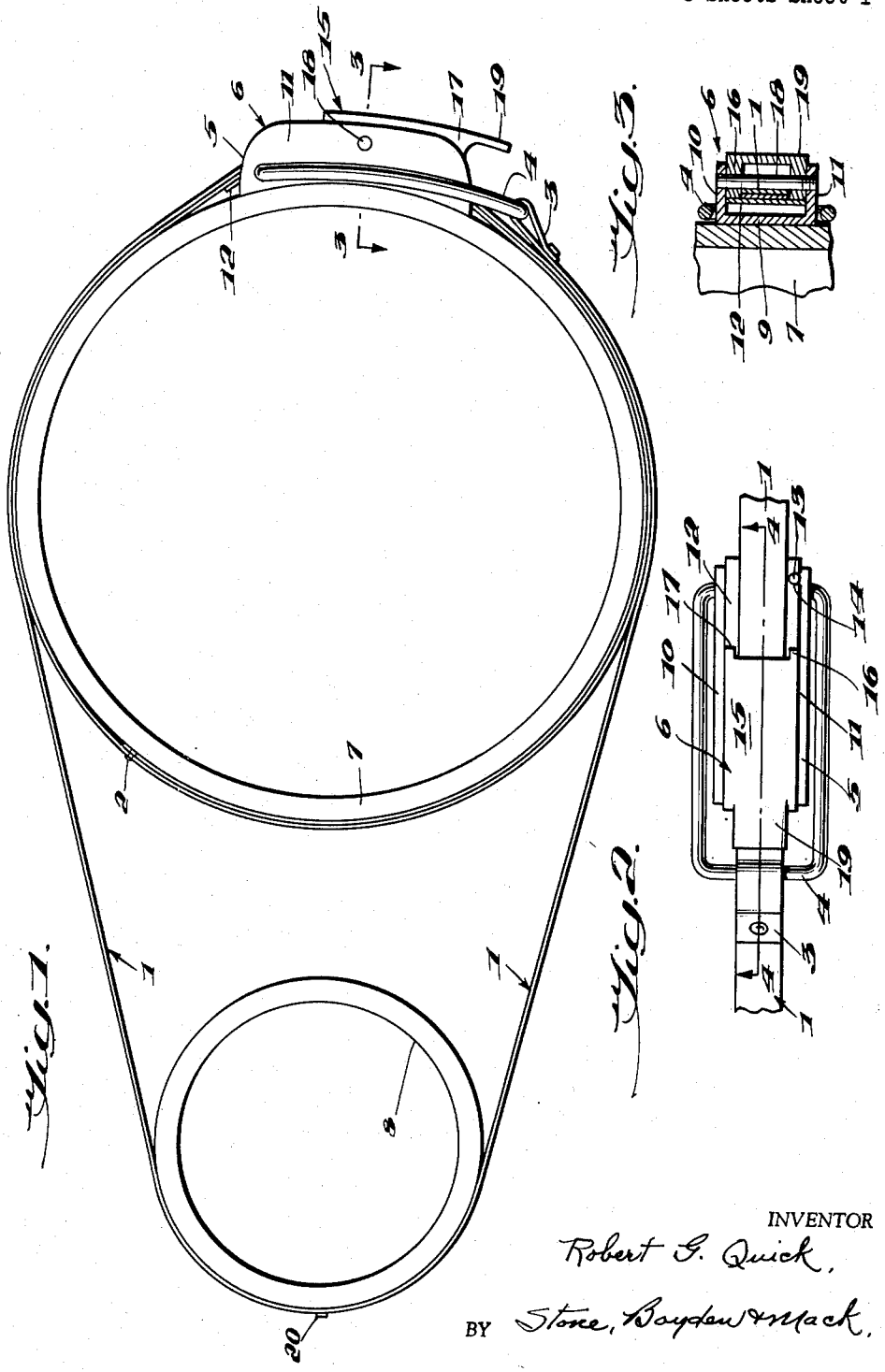
INVENTOR
Robert G. Quick,
BY Stone, Boyden & Mack,
ATTORNEYS.

May 20, 1958  R. G. QUICK  2,835,135
MOTION TRANSMITTING DEVICES
Filed June 6, 1956  3 Sheets-Sheet 2
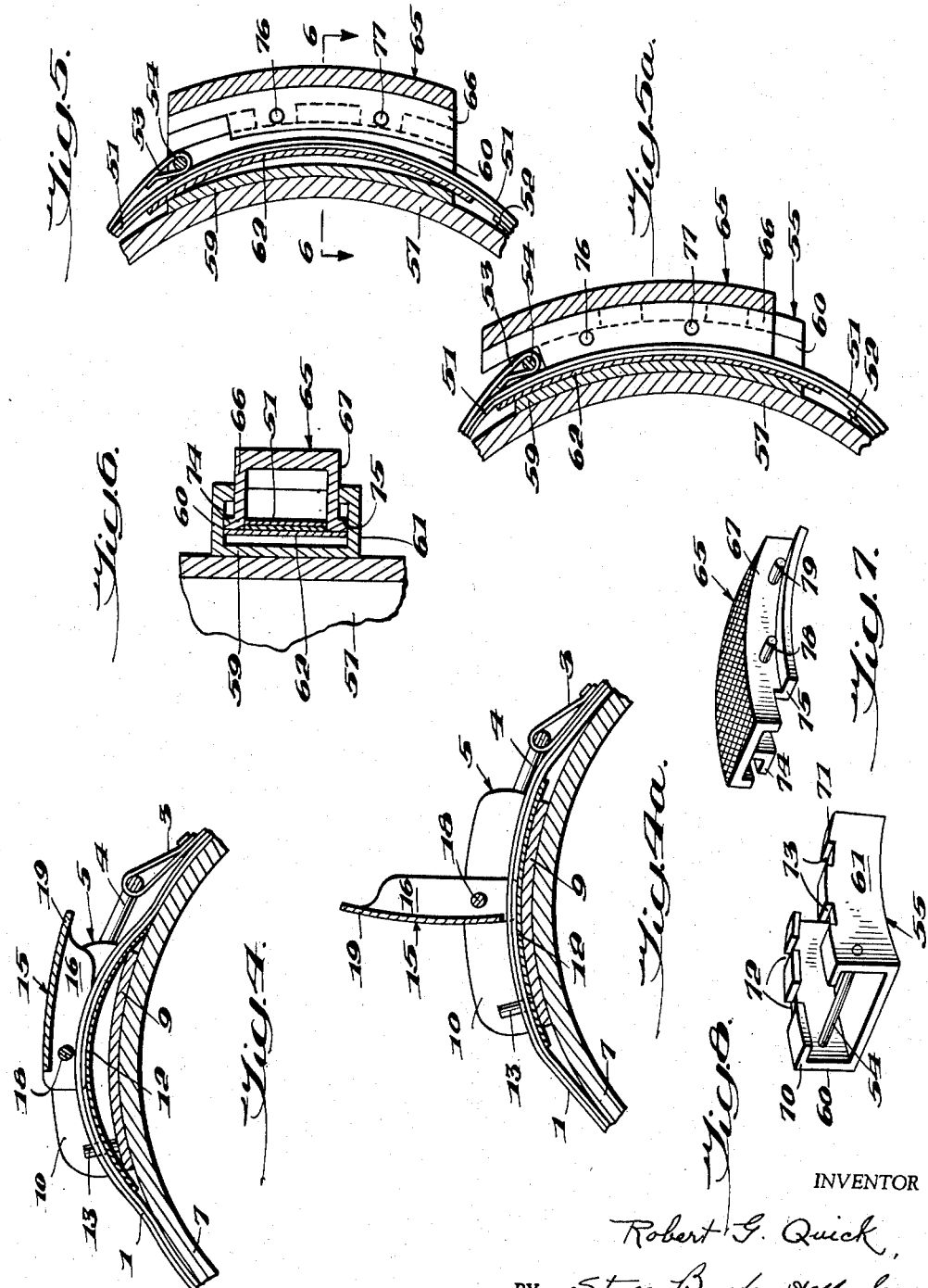
INVENTOR
Robert G. Quick,
BY Stone, Boyden & Mack,
ATTORNEYS.

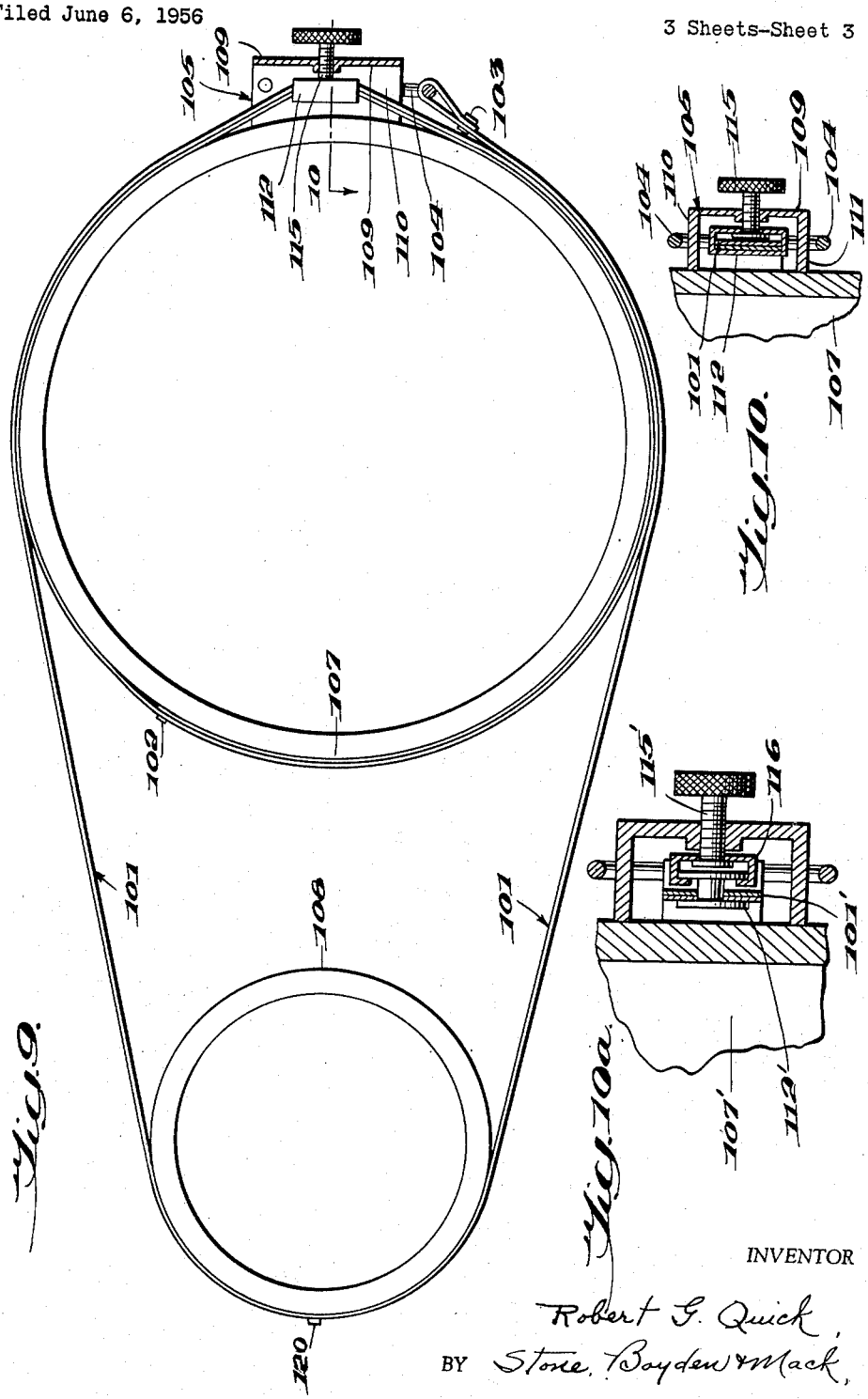

United States Patent Office 2,835,135
Patented May 20, 1958

2,835,135

MOTION TRANSMITTING DEVICES

Robert G. Quick, Richmond, Va., assignor to Flight Research, Incorporated, a corporation of Virginia Application June 6, 1956, Serial No. 589,626

10 Claims. (Cl. 74—222)

This invention relates to motion transmitting devices and particularly to an improved tape or belt drive mechanism for imparting rotary motion from a driving member to a driven member to move the latter through part of one revolution.

The problem of adjusting a rotary member through part of one revolution arises in many devices. One example of a device to which the invention is particularly applicable is the camera aperture adjusting device disclosed in my copending application, Serial Number 589,649, filed concurrently herewith. In that device, the driving member is a rotary cylinder disposed parallel to the camera lens tube. The purpose of the device is to impart a precise amount of rotary movement to the aperture ring of the camera lens tube in response to movement of the driving cylinder accomplished by power means controlled by a light-sensitive system. Rotation of the aperture ring adjusts the camera aperture in accordance with the prevailing light condition. Since any one of a plurality of interchangeable lens tubes, each having an aperture adjusting ring of a different circumference and a different axial position, may be employed, the means for imparting motion from the driving cylinder to the aperture ring of the lens tube must be capable of adjustment to compensate for the difference in size and axial position of the aperture adjusting ring. Also, the motion transmitting means must allow manual adjustment of the driving cylinder to a "zero" position while the aperture ring is held in a position providing a given opening or "stop."

Numerous motion transmitting mechanisms have been proposed in the past for such applications. Thus, prior-art workers have employed lever and crank systems, gears, rack and pinion drives, and other conventional mechanisms. Such mechanisms are frequently unsatisfactory, since transmission of motion must be accomplished with only a very small amount of power and yet with considerable preciseness. Further, conventional mechanisms have not provided the ready adjustability required, for example, in the camera aperture adjusting system of the aforementioned copending application. Some of the disadvantages of such conventional drive mechanisms are avoided by using a tape or belt drive. But, conventional tape or belt drives do not offer the necessary ready adjustability to accommodate driven members of different size, and also present difficulties in maintaining a satisfactory frictional engagement between the tape and the driving and/or driven member without subjecting such members to undue lateral strain.

The present invention provides an improved tape or belt drive which overcomes the foregoing disadvantages. A particular advantage of the invention is the provision of simple means by which the driving tape may be quickly and positively adjusted from tight driving relation to a slackened condition for adjustment. Another characteristic of the invention is provision of such a device wherein the effective length of the driving tape can be readily changed, as for adjustment to accommodate driving or driven members of different sizes, and a positive driving relationship quickly re-established after such adjustment.

Broadly, the advantages of the invention are accomplished by means of two novel features. The first feature is the provision of a tape locking device comprising means acting to form in the tape a bulge of sufficient magnitude to maintain a driving relationship between the tape and such member, the tape locking device being so constructed that the bulge can be readily removed from the tape, to slacken the same, and then re-established. The second feature is the disposition of the tape in such manner that the tape passes completely around the driving member, or the driven member, preferably in at least two complete convolutions, and extends about the other of such members only in the usual manner, one end of the tape being attached to the body of the tape and the other being attached to the tape locking device, in such manner as to provide for ready adjustment of the effective length of the tape as hereinafter explained in detail.

In order that the invention may be understood in detail, reference is had to the accompanying drawings, which form a part of this specification, and wherein:

Fig. 1 is an elevational view of a motion transmitting mechanism constructed in accordance with one embodiment of the invention;

Fig. 2 is a plan view of the tape locking device of the mechanism of Fig. 1;

Fig. 3 is a transverse sectional view of the tape locking device, taken on line 3—3, Fig. 1;

Fig. 4 is a longitudinal sectional view of the same, taken on line 4—4, Fig. 2;

Fig. 4ᵃ is a view similar to Fig. 4, but with the adjusting element of the tape locking device in a different position to illustrate operation of the device;

Fig. 5 is a longitudinal sectional view, similar to Fig. 4, of a modified form of tape locking means representing another embodiment of the invention;

Fig. 5ᵃ is a view similar to Fig. 5, but with adjusting slide of the tape locking means in a different position to illustrate operation of the device.

Fig. 6 is a transverse sectional view taken on the line 6—6, Fig. 5;

Fig. 7 is a view in perspective of the adjusting slide of the device of Figs. 5–6;

Fig. 8 is a view in perspective of the base member of the tape locking means of Figs. 5–6;

Fig. 9 is an elevational view of a motion transmitting mechanism constructed in accordance with another embodiment of the invention;

Fig. 10 is a transverse sectional view of the tape locking device of such embodiment, taken on line 10—10, Fig. 9, and Fig. 10ᵃ is a view similar to Fig. 10, but on enlarged scale, illustrating a modification of this embodiment of the invention.

Referring to the drawings in detail, and first to Figs. 1–4ᵃ, it will be seen that this embodiment of the invention comprises a drive tape 1 disposed generally in the form of a spiral with the end of the tape inwardly of the spiral being attached to the body of the tape at 2, as by a rivet, the other end of the tape being connected, as by a loop and rivet at 3, to bail 4 pivoted to the side walls of the base member 5 of a tape locking means 6. It will be noted that somewhat more than one and one half convolutions of the tape 1 encircle a rotary driving member 7, while the outermost convolution of the tape extends from tape locking means 6 partly around driving member 7, thence to a rotary member 8 to be turned through part of one rotation, thence about said driven member and back around driving member 7 to tape locking means 6.

As seen in Fig. 3, the base member 5 of tape locking means 6 is of channel cross-section, the bottom wall 9 thereof being of arcuate form to match the outer surface of driving member 7, the member being completed by flat, parallel side walls 10 and 11 extending at right angles to the bottom wall. Two convolutions of the tape 1 extend through the channel of base 5 longitudinally. It will be noted that the dimensions of the tape locking means 6 are small relative to the length of the tape 1, and that the width of the tape is somewhat less than the distance between side walls 10 and 11.

Disposed longitudinally within the channel of base 5 is an arcuate spring 12. The ends of bottom wall 9 of base 5 engage the concave surface of spring 12 at longitudinally spaced points, while the convex surface of the spring faces outwardly, contacting the under side of tape 1. The radius of curvature of the spring 12 is small relative to that of driving member 7, and the chord length of the spring is longer than the chord length of the arcuate bottom wall 9 of base 5. As seen in Figs. 2 and 4, a guide pin 13 is fixed in bottom wall 9 and extends radially outwardly therefrom, while the spring 12 is provided with a notch 14 engaging pin 13. Thus, the spring can be flattened against bottom wall 9 and released without being displaced longitudinally. From Fig. 3, it will be noted that the width of spring 12 is substantially equal to the space between side walls 10 and 11, so that the spring fits snugly within the channel formed by base 5.

Referring to Fig. 4, it will be seen that spring 12 acts between the tape 1 and driving member 7, with bottom wall 9 intervening, to form an arcuate bulge in the portion of tape 1 threaded through the base member 5. Assuming that the circumferential position of end connection 2 of tape 1 on driving member 7 has been properly adjusted to provided a snug fit of the tape on the driving member when spring 12 is flattened against bottom wall 9, then release of the spring toward its normal position will, by causing the bulge seen in Fig. 4, tighten the tape on driving member 7 to an extent dependent upon the size of the bulge, and thus upon the strength and size of the spring. In practice, the preliminary adjustment of the tape, with the spring flattened, is made such that the convolutions of the tape encircling the member 7 are initially tight enough to prevent spring 12 from returning to its fully relaxed position. Thus, the spring will always be somewhat flexed in compression, even with the parts in the relation shown in Fig. 4, so that the spring continually tensions the tape.

To flatten the tape, this embodiment of the invention employs a lever 15, U-shape in cross-section, with the side walls 16 and 17 of the lever in contact with the inner surfaces of side walls 10 and 11 of base 5. Lever 15 is pivoted to base 5 by a pin 18 passing through side walls 10, 11, 16 and 17, Fig. 3. At one end, the side walls 16, 17 of lever 15 extend beyond top wall 19 to form on the lever a bifurcated end, the legs of the bifurcated end having rounded tip portions. Spring 12 is centered on tape 1 and, being wider than the tape, has portions exposed at each side of the tape. As shown in Fig. 3, the legs of the bifurcated end of lever 15 are respectively aligned with such exposed portions of the spring. As seen in Figs. 4 and 4ᵃ, the distance between the pivot pin 18 and the tips of the bifurcated end of the lever 15 is such that, when the lever is pivoted to a position normal to bottom wall 9, the bifurcated end of the lever flattens the spring 12 against the arcuate bottom wall 9, so removing the bulge from the tape 1. Opposite the bifurcated end of the lever, the top wall 19 is extended beyond the side walls 16, 17 for ease of manipulation.

When it is desired to slacken the tape 1 on driving member 7 for adjustment, or to vary the effective length of the tape, as necessary to adjust to a different size of driven member, the lever 15 is pivoted to the position shown in Fig. 4ᵃ, so flattening the spring 12 and removing from the tape the arcuate bulge seen in Fig. 4. If the effective length of the driving tape 1 is then to be changed, this is accomplished by sliding the convolutions of the tape which embrace driving member 7 around that member in rotation, clockwise in Fig. 1 to shorten the effective length of the tape, counterclockwise in Fig. 1 to lengthen the same. When the desired adjustment has been made, lever 15 is pivoted back to the position seen in Fig. 4, with the lever parallel to wall 9. Such action releases the spring, allowing it to flex outwardly, re-establishing the bulge in the tape.

It is to be noted that this action of spring 12 tightens the tape on driving element 7, but does not affect the tightness of the tape on driven element 8. For applications where lateral forces on the driven element 8 are to be minimized, a driving relation between tape 1 and element 8 can be maintained by providing element 8 with a pin 20, Fig. 1, engaging a matching hole in tape 1.

In the second embodiment of the invention, illustrated in Figs. 5–8, the device is like that seen in Fig. 1 except that a tape locking means including a cammed slide 65 is employed in place of the lever mechanism just described. Here, the base of the tape locking means is a member 55, Fig. 8, having an arcuate bottom wall 59 and upstanding side walls 60 and 61. At their free edges, side walls 60 and 61 are provided with inturned flanges 70 and 71, respectively, each provided with a pair of spaced notches 72, 73, respectively.

The arcuate spring 62 is disposed on said base member with its concave surface being engaged at longitudinally spaced points by the ends of arcuate bottom wall 59, the convex surface of spring 62 again being disposed in contact with the under surface of tape 51. The arcuate bottom wall 59 of base 55 again fits the surface of driving member 57, and the spring 62 acts to form an arcuate bulge in tape 51 to tighten the tape on the driving member. In this embodiment, the innermost end of the tape it attached to the body of the tape, as by a rivet at 52, and the outermost end of the tape is connected to base member 55 by being looped about pin 54 and secured, as by a rivet, at 53. Disposition of the drive tape with respect to the driving and driven members is otherwise as hereinbefore described with reference to Fig. 1.

The slide 65 is provided with dependent side walls 66 and 67 terminating in outwardly directed arcuate flanges 74 and 75, respectively. As seen in Fig. 6, spring 62 is wider than tape 51 and is centered with respect thereto. The side walls 66 and 67 straddle tape 51, so that flanges 74 and 75 are disposed above edge portions of spring 62 exposed at each side of the tape. Above flanges 74 and 75, side walls 66 and 67 are each provided with a pair of longitudinally spaced, laterally projecting pins 76, 77 and 78, 79, respectively. The spaces between pins 76 and 77, pins 78 and 79 are such that the two sets of pins may pass through notches 72 and 73, respectively. With tape 51, base 55 and spring 62 assembled as just described, slide 65 is inserted into base 55 endwise, with pins 76, 77 and 78, 79 sliding along the lower surfaces of flanges 70 and 71, respectively. Since the space between the bottom of flanges 74, 75 and the uppermost surfaces of pins 76–79 is greater than the normal distance between flanges 70, 71 and the convex surface of spring 62, insertion of the slide 65 in base member 55 causes the spring to be flattened, as seen in Fig. 5ᵃ. But, when the slide has been moved until the pins 76–79 reach the corresponding notches 72, 73, the pins move outwardly into the notches and the spring 62 is allowed to relax toward its normal arcuate shape, forming the desired bulge in tape 51, as seen in Fig. 5, to tighten the tape on driving member 57. To slacken the tape again, the slide 65 is pressed toward member 57, compressing the spring 62, and is then moved longitudinally of base 55 in either direction until pins 76–79 again lie under flanges 72, 73.

It will be understood that the driving member 57, bottom wall 59, flanges 70, 71 and flanges 74, 75 all have the same center of curvature, and that pairs of pins 76, 77 and 78, 79 are each positioned along lines also having this center of curvature.

In the embodiment of the invention shown in Figs. 9 and 10, a device similar to that of Fig. 1 is employed, but without using an arcuate spring as the means for establishing the desired bulge in the tape. Here, tape 101 is again arranged generally in a spiral, with the innermost end of the tape secured to the body of the tape, as by a rivet at 102, and the outermost end of the tape looped about bail 104 and secured, as by a rivet at 103. The bail is pivoted to base 105 of tape locking means 106. The innermost convolutions of the tape encircle rotary driving member 107, and the outermost convolution extends about both the driving member and driven member 108, as shown.

Base 105 is of channel cross-section including a wall 109, spaced from driving member 107, and side walls 110 and 111. The side walls 110 and 111 have arcuate free edges adapted to engage the periphery of driving member 107, and are spaced apart sufficiently to allow tape 101 to pass freely therebetween. Within base member 105, tape 101 passes through a hollow member 112. An adjusting screw 115 is threaded through wall 109 of member 105, extends freely through the outermost wall of hollow member 112, and is provided with a retaining flange within that member. Thus, screw 115 is free to rotate relative to hollow member 112 such rotation causing the member 112, and therefore tape 101, to move either toward or away from driving member 107, depending upon the direction of rotation. When the tape is to be tightened against driving member 107, screw 115 is simply rotated, in a direction moving member 112 outwardly, until the desired bulge has been pulled in tape 101. Opposite rotation of the screw slackens the tape.

Driven member 108, like member 8 of Fig. 1, may be provided with a pin 120 engaging a matching hole in tape 101.

In the modification illustrated in Fig. 10a, the hollow tape engaging element 112 of Fig. 10 is replaced by a stud 112′, the body of which passes through matching openings in the tape 101′. One head of the stud engages the under side of the tape, while the other head is spaced outwardly of the tape. A yoke 116, carried by the free end of adjusting screw 115′, engages under said other head of stud 112′, so that adjustment of the screw causes the stud, and thus the tape, to be moved inwardly or outwardly relative to the member 107′, depending upon the direction of rotation of the screw.

While, in all of the embodiments of the invention illustrated, the tight relationship has been described as between the tape and the driving member, it will be understood that such relationship can be between the tape and the driven member. Thus, in Fig. 1, member 8 may be the driving member, and member 7 the driven member. It will also be understood that the number of convolutions of tape encircling such member may be varied to any degree desired, so long as a sufficient length of tape is provided to allow the desired adjustment of the effective tape length.

While any suitable material may be employed for the tape, I have found that metal tapes, particularly of stainless steel or beryllium-copper alloys, are advantageous.

I claim:

1. In a device of the type described, the combination of a rotary driving element, a rotary driven element to be turned through part of one revolution, a drive tape extending about said elements, and adjusting means independent of the driving and driven elements for selectively tightening and slackening said tape, said means including a base member carried by the tape for movement therewith and in contact with one of said rotary elements, a tape tensioning element disposed in contact with the underside of said tape, and an adjusting member carried by said base member and operatively associated with said tape tensioning member to selectively adjust the same outwardly of said base member to tighten said tape or inwardly of said base member to release said tape.

2. The device of claim 1, wherein one end of said tape is connected to said base member and the other end of said tape is attached to the body of the tape, said tape extending for more than one complete turn about said one rotary element.

3. In a device of the type described, the combination of a rotary driving element, a rotary driven element to be turned through part of one revolution, a driving tape extending about said rotary elements, and adjusting means for selectively tightening and slackening said tape, said means including an arcuate spring positioned between said tape and one of said rotary elements and having a radius of curvature materially smaller than the radius of curvature of said tape about said one rotary element, whereby said spring causes an arcuate bulge in said tape to tighten the same on said one rotary element and adjustable means operatively associated with said spring for flattening the same to slacken the tape.

4. In a device of the type described, the combination of a rotary driving element, a rotary driven element to be turned through part of one revolution, a substantially non-extensible flexible driving tape wound for more than one turn on one of said rotary elements and extending from said one rotary element around said other rotary element and back to said one element, and adjusting means for selectively tightening and slackening said tape, said adjusting means including an arcuate spring disposed between said one element and said tape with the convex surface of the spring engaging the tape, and an adjustable member operatively associated with said spring for flattening the same to slacken the tape, one end of said tape being connected to said adjusting means and the other end being attached to the body of the tape.

5. A drive tape assembly for coupling a driving and a driven element together comprising the combination of a substantially non-extensible driving tape and means for selectively tightening and slackening said tape, said means comprising a base, an arcuate spring carried by said base with the convex surface of the spring engaging the undersurface of the tape, said base including a portion engaging the concave face of said spring at two longitudinally spaced points, a portion of said spring being exposed laterally of said tape, and a member adjustably mounted on said base and disposed to be brought into contact with the exposed portion of said spring to flatten the spring and release the tape.

6. The combination of claim 5 wherein said spring is wider than said tape and is centered with respect to said tape, whereby portions of the spring are exposed at each side of the tape, and said adjustably mounted member is a lever pivoted to said base and provided with a bifurcated end straddling said tape and disposed to be brought into engagement with said exposed portions of said spring.

7. The combination of claim 5 wherein said spring is wider than said tape and is centered with respect to said tape, whereby portions of the spring are exposed at each side of the tape, and said adjustably mounted member is a slide of inverted U-shape cross-section positioned astride the tape with the legs of the U disposed for engagement with said exposed portions of said spring, said base and slide being provided with cooperating cam means constructed to maintain said slide in a position flattening said spring when said slide occupies a longitudinally adjusted position.

8. A drive tape assembly for coupling a driving and a driven element together comprising a substantially non-extensible tape and means for selectively tightening and slackening said tape, said means comprising a base having parallel side elements between which said tape extends, an arcuate spring carried by said base and disposed with its convex surface in contact with the underside of said tape, and an adjusting member movably connected to said base and disposed for movement against the convex surface of said spring to flatten the same, one end of said tape being connected to said base, the other end of said tape being attached to the body of the tape.

9. A drive tape assembly for coupling a driving and a driven element together comprising a substantially non-extensible tape and means for selectively tightening and slackening said tape, said means comprising a base member of channel cross-section, said tape passing longitudinally through the channel of said base member, an arcuate spring carried by said base member and disposed with its convex surface in contact with the underside of said tape with portions of said spring exposed laterally of said tape, and an adjusting member movably mounted between the sidewalls of said base member and disposed to be brought into contact with the exposed portions of said spring to flatten the spring, one end of said tape being connected to said base member, the other end of said tape being attached to the body of the tape.

10. A tape drive assembly for imparting part-rotational motion from a rotary driving member to a rotary driven member, comprising the combination of a substantially non-extensible drive tape disposed in the form of a plurality of convolutions of a spiral with the end of the tape inwardly of the spiral being attached to the body of the tape, a rigid member having dimensions which are small with respect to the length of the tape, the other end of said tape being connected to said member, whereby said tape and member form a drive tape assembly one convolution of which may extend about both a driving and a driven member while other convolutions encircle only one such member, and means adjustably carried by said rigid member and including an element engaging the underside of said tape and means for selectively moving said element outwardly and inwardly relative to the convolutions of said tape to tighten and slacken the tape, respectively, when the tape assembly is disposed on a driving and driven member.

References Cited in the file of this patent

UNITED STATES PATENTS

| | | |
|---|---|---|
| 1,244,383 | Snider | Oct. 23, 1917 |
| 2,224,193 | Mahnken | Dec. 10, 1940 |
| 2,271,133 | Thoresen | Jan. 27, 1942 |